Figure 1:
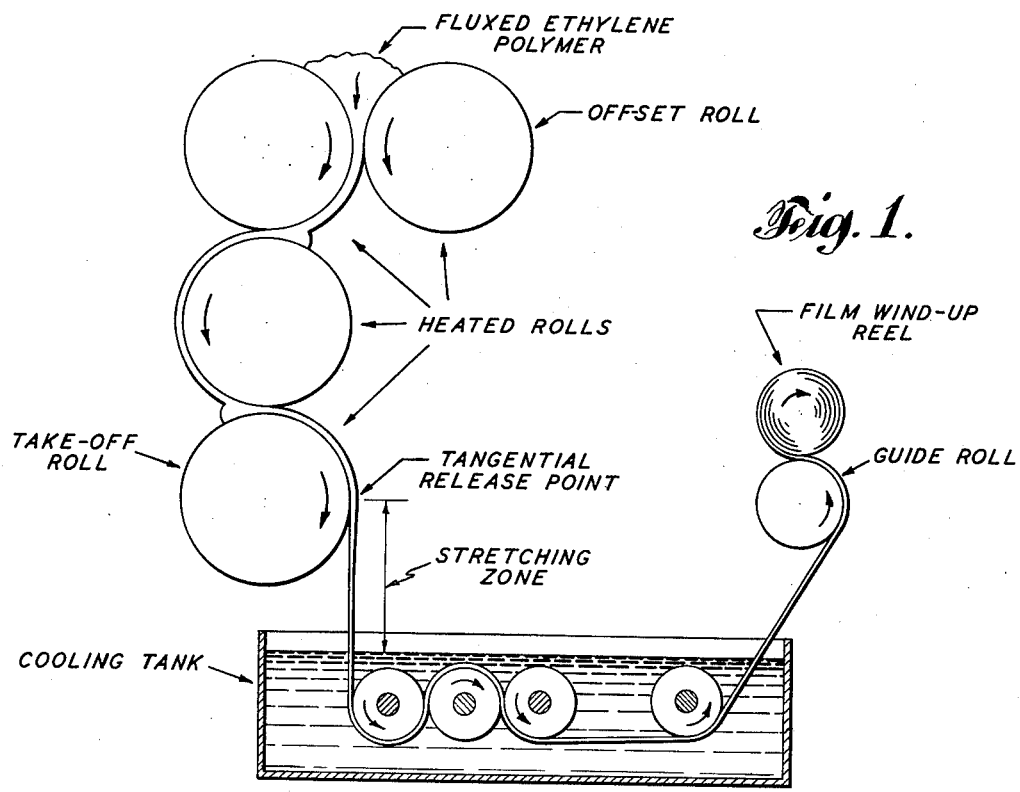

Feb. 26, 1952     W. F. HEMPERLY ET AL     2,586,820
POLYETHYLENE FILM MANUFACTURE

Filed June 26, 1948

INVENTORS
WILLIAM F. HEMPERLY
NELSON R. SMITH
BY
ATTORNEY

Patented Feb. 26, 1952

2,586,820

UNITED STATES PATENT OFFICE 2,586,820

POLYETHYLENE FILM MANUFACTURE

William F. Hemperly, Westfield, and Nelson R. Smith, Somerville, N. J., assignors, by mesne assignments, to Union Carbide and Carbon Corporation, a corporation of New York Application June 26, 1948, Serial No. 35,366

5 Claims. (Cl. 18—47.5)

This invention relates to preparation of continuous lengths of unsupported film of less than 0.004 inch thickness from normally solid ethylene polymers and more particularly to films of about 0.001 inch thickness.

Ethylene polymers are obtained by polymerization of ethylene in the presence or absence of a catalyst at intermediate to very high pressures. The ethylene polymers used in the practice of this invention are tough solids at room temperatures, and have average molecular weight in excess of 15,000 and up to about 36,000 and higher when determined by the viscosity-molecular weight method as modified by A. R. Kemp and H. Peters (Industrial and Engineering Chemistry, vol. 34, No. 9; vol. 35, No. 10).

The solid ethylene polymers soften or "melt" sharply at temperatures between about 108° C. and 112° C. At higher temperatures and up to about 200° C., the polymers are in the form of extremely viscous liquids characterized by objectionally high adhesion to hot metal surfaces, such as molds and calender rolls.

The adhesion to hot surfaces was particularly troublesome in earlier efforts to use the economical and rapid calendering process for forming continuous sheets or films from normally solid ethylene polymers. At most a sheet having a length only equivalent to the calender rolls' circumference could be formed, because cooling of the roll to practically room temperature was required before the polymer was sufficiently rigidified to permit its removal without tearing or permanent deformation of its dimensions. Subsequently it was found that the addition to the solid ethylene polymers of small amounts (0.05 to 2.0% by weight) of so called mold-release agents such as long chain fatty acids or the polyhydric alcohol esters or metal soaps of these acids effectively reduced the adhesion to hot metal surfaces whereby it was possible to continuously produce films of at least 0.004 inch thickness on conventional three-roll or four-roll calenders and to remove the film from the roll surface, while at a temperaure above the softening temperature of the polymer, without injury to or appreciable deformation of its calendered dimensions. It was found impractical despite the presence of release agents, to prepare on calenders films of less than 0.004 inch thickness because such films were too weak at calendering temperatures (130°–160° C.) to withstand the pulling tension required to remove them from the hot roll surface by conventional methods. Ethylene polymer films between 0.001 and 0.002 inch thickness are sufficiently water resistant as well as tough and flexible to be suitable for use as moisture-proof wrapping material of foods and other water-sensitive substances and are therefore in demand.

Accordingly the present invention has as an object the production by a modified calendering and stretching process of continuous films less than 0.004 inch thickness from normally solid ethylene polymers. A further object is the production of film substantially free of strains as evidenced by low shrinkage and deformation at heat-sealing temperatures. Other objects will apepar hereinafter.

These objects are accomplished by the following sequence of steps: a normally solid polymer of ethylene containing a small amount of release agent and preferably, a small amount of an antioxidant agent for the polymer, is fluxed or melted. The fluxed polymer is transferred to the upper rolls of a three-roll or four-roll speed calender, all rolls being maintained at a temperature between 130° and 150° C. and preferably at 140° C. to 150° C. By conventional calendering technique a sheet of at least 0.004 inch thickness is finally formed on the take-off calender roll and then is pulled off the take-off roll tangentially thereto, and preferably in a downward direction whereby the film establishes a constant release point on the moving take-off roll and is not subjected to sagging as with horizontal pulling. The released sheet is temporarily maintained above the melting temperature of the ethylene polymer and preferably between 130° and 140° C. and while it is at this temperature, the sheet is subjected to sufficient pulling force uniformly applied along its width to stretch or elongate it longitudinally and permanently until its thickness is reduced to desired dimensions. Then the elongated film, while still maintained at a temperature above its softening temperature and still subjected to the stretching tension, is immediately chilled to temperature below about 80° C. and preferably to about 30°–40° C. as by immersion in a non-solvent liquid, for instance water. The chilled film is then removed from the cooling liquid and wound on rolls or otherwise suitably packaged for shipment to consumers.

Stretching of the film while at a temperature above its softening point followed by immediate cooling of the elongated film are essential steps in the process for obtaining film characterized by improved transparency, surface smoothness, good tensile strength, and minimum shrinkage when exposed as a relaxed film to elevated temperatures as high as 100° C. Shock-cooling the film so toughens it that it is not further permanently elongated by tension force adequate to stretch the film while at calendering temperatures. In contrast, calendered films not chilled after hot-stretching, but instead permitted to cool slowly while under stretching tension as by exposure to atmospheric air at room temperature were less transparent, had a rougher surface and were highly strained as evidenced by considerable shrinkage when reheated in a relaxed condition to 100° C. It is believed that in the instance of a film slowly cooled while subjected to a stretching tension, some of the total permanent elongation occurs after the film has cooled to cold-drawing temperatures, whereby the polyethylene molecules are more or less permanently oriented. This is evidenced by the fact that such films cannot be heat-sealed or welded without excessive shrinkage.

Illustrative apparatus for carrying out the present invention is shown in the accompanying drawing in which, Fig. 1 is a diagrammatic illustration in vertical section of a four-roll calender and a cooling tank provided with driven conveyor rollers for stretch-pulling a film or sheet of ethylene polymer off the calender's take-off roll and conveying the sheet through the cooling tank.

Figure 2:
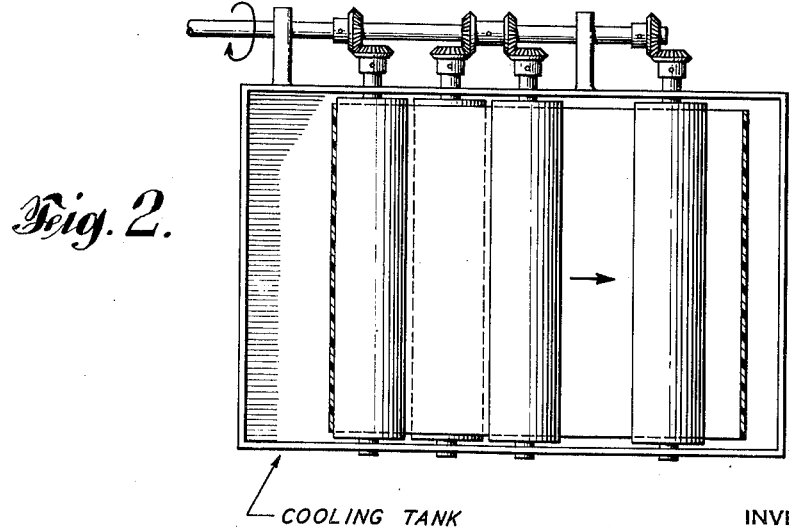

Fig. 2 is a top view of the cooling tank and illustrates the method of coupling the several conveyor rolls to a driving shaft to rotate them in suitable directions to continuously convey the sheet through the cooling tank. The driving shaft is coupled to a driving means not shown in the drawing but which may be the same means employed for rotating the calender rolls. Whatever driving means are employed for the calender rolls and the conveyor rolls, such means are modified with suitable conventional speed control means to obtain a constant higher peripheral speed on the conveyor rolls than the calender rolls.

The following example is illustrative of the practice of the invention:

*Example*

A normally solid polymer of ethylene having an average molecular weight of 20,000 was fluxed or melted on milling rolls heated to a temperature of 150° C. There was added to the fluxed polymer per 100 parts thereof by weight, 0.5 part zinc stearate as release agent and 0.2 part of a fatty oil soluble phenolic resin (a condensation product of amyl phenol and formaldehyde) as an antioxidant stabilizer. The release agent and antioxidant were dispersed in the polymer by the mixing action of the milling rolls, and the resultant mixture was transferred to the calender rolls as a feed bank between the top and offset rolls of the calender, both rolls being at a temperature of 150° C. The polymer was picked up by the middle roll and then transferred as a film of 0.004 inch thickness to the bottom or take-off roll. The middle roll and take-off rolls were heated to temperatures of 145° C. and 150° C. respectively. All the rolls of the calender rotated at equal peripheral speeds of 30 feet per minute. A sheet was pulled off the take-off roll tangentially thereto and in a downward direction and then threaded about conveyor rolls submerged in a tank of water maintained at room temperature (30° C.) After threading of the sheet about the conveyor rolls, they were rotated at a constant peripheral speed of about 120 feet per minute causing the sheet to be elongated and reduced to 0.001 inch thickness in the space or stretching zone between the constant vertical tangential release point on the take-off roll and the surface of the cooling water; this space being about 4 to 6 inches. The average temperature of the sheet from the moment it departed from the take-off roll and until it made contact with the cooling water was between 130° C. and 140° C. The major reduction in film thickness was found to occur close to the tangential release point. The film after cooling was removed from the cooling tank and wound in rolls. The film thus produced had an average thickness between 0.0010 and 0.0012 inch during continuous production, an average tensile strength at 25° C. of better than 1500 pounds per square inch, and when heated under no tension for one hour in an oven maintained at 100° C. exhibited less than 5% shrinkage of its dimensions at 25° C.

Other release agents and anti-oxidants can be satisfactorily substituted for those mentioned in the example. Compounds suitable for release agents include higher fatty acids such as stearic, oleic, linoleic, carnaubic and palmitic for example. The polyhydric alcohol esters or metal salts of such acids may also be used as release agents or lubricants. As other suitable antioxidants, there may be used diphenylamine, phenyl-beta-naphthylamine, hydroquinone, and phenols having a molecular weight above 200.

I claim:

1. Process for producing plastic film from a normally solid polymer of ethylene containing a small amount of a release agent which comprises the steps of calendering a normally solid ethylene polymer at a temperature above its softening point, forming on the calender's take-off roll a sheet of the polymer, removing the sheet from said roll while said sheet is at a temperature above its softening temperature, longitudinally stretching the removed sheet to reduce its thickness while it is maintained at above its softening temperature, and then immediately chilling the stretched sheet to a temperature less than 80° C. while maintaining said tension on said sheet.

2. Process for producing plastic film from a normally solid polymer of ethylene having an average molecular weight more than 15,000 and containing a small amount of release agent, which comprises forming a sheet of the polymer on the surface of the take-off roll of a calender, maintained at a temperature above the softening temperature of said polymer, tangentially removing the sheet from the surface of said roll while at a temperature above its softening temperature, applying longitudinal tension to the removed sheet while it is substantially at its calendering temperature, said tension being sufficient to stretch the sheet and reduce its thickness, and then rapidly chilling the stretched sheet to a temperature less than 80° C. while subjected to said tension.

3. A process for producing thin plastic film from a normally solid polymer of ethylene which comprises calendering at a temperature above its softening point, a normally solid polymer of ethylene having an average molecular weight of at least 15,000 and containing small amounts of release agent and oxidation inhibitor, forming a sheet of the polymer having a thickness of at least 0.004 inch on the take-off roll of the calender, removing said sheet tangentially and in a downward direction away from said roll while said sheet is at a temperature above its softening temperature, applying longitudinal tension to the removed sheet to stretch the sheet and reduce its thickness while maintaining the sheet at a temperature between 130° and 140° C., and then chilling the stretched sheet while still subjected to said tension by immersing it in a non-solvent liquid at a temperature less than 80° C.

4. Process for the manufacture of thin films from a normally solid polymer of ethylene containing a small amount of a release agent, which comprises fluxing the polymer on heated calender rolls to form a calendered film, longitudinally stretching the calendered film to reduce its thickness while maintained substantially at the calendering temperature and chilling the stretched film.

5. A process for continuously producing a plastic film of not less than 0.004 inch thickness from a normally solid polymer of ethylene having a molecular weight of at least 15,000 and containing small amounts of a release agent and an oxidation inhibitor, which process comprises calendering said polymer at a temperature above its softening point to a thickness of at least 0.004 inch on the take-off roll of the calender, removing the sheet of calendered polymer tangentially and in a downward direction away from said take-off roll while at a temperature above its softening point, applying a substantially uniform, longitudinal tension to said removed sheet to stretch the sheet and reduce its thickness to less than 0.004 inch, said stretching being accomplished while said polymer sheet is at a temperature above its softening point, and then quickly chilling the stretched sheet while still subject to such tension by immersing it in a non-solvent liquid at a temperature of less than 80° C.

WILLIAM F. HEMPERLY.
NELSON R. SMITH.

REFERENCES CITED

The following references are of record in the file of this patent:

UNITED STATES PATENTS

| Number | Name | Date |
|---|---|---|
| 2,219,700 | Perrin | Oct. 29, 1940 |
| 2,317,447 | Domizi | Apr. 27, 1943 |
| 2,321,635 | Taylor | June 15, 1943 |
| 2,405,977 | Peters | Aug. 20, 1946 |